April 21, 1964     G. A. MOWER     3,129,852
AGRICULTURAL DISPENSER
Filed May 7, 1962
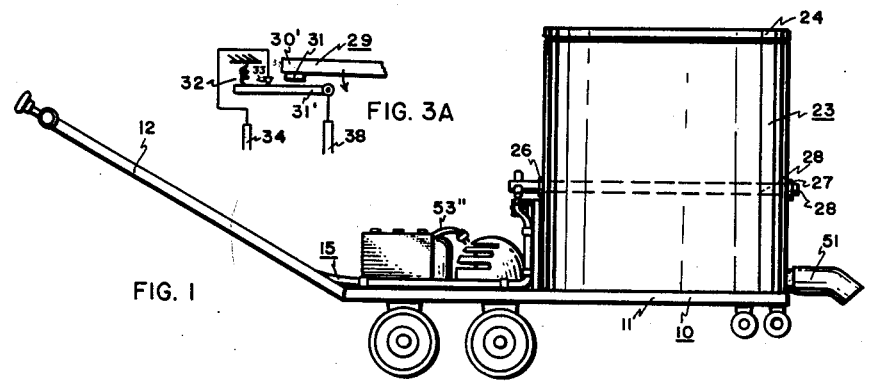
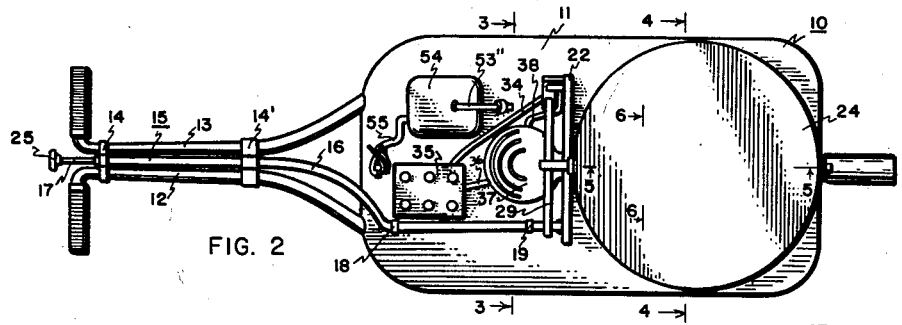
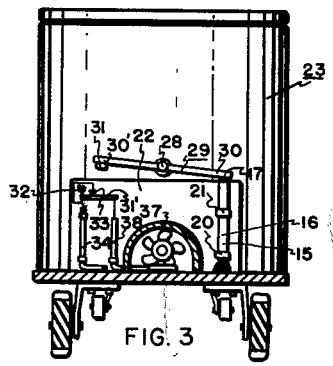
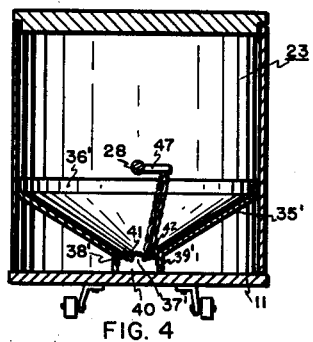
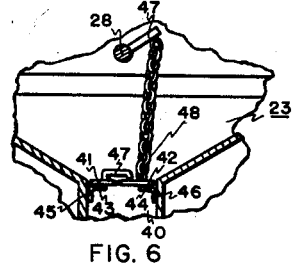
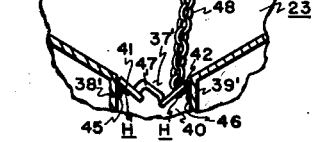
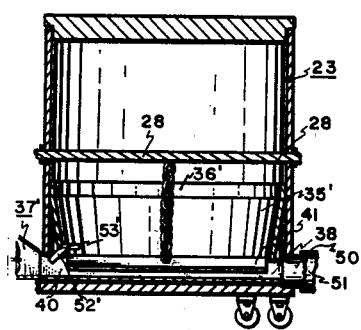
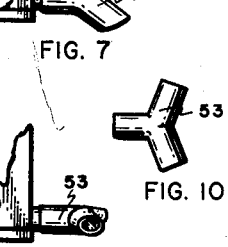
*INVENTOR.*
GEORGE A. MOWER
BY *M. Ralph Shaffer*
HIS ATTORNEY

United States Patent Office

3,129,852
Patented Apr. 21, 1964

3,129,852
AGRICULTURAL DISPENSER
George A. Mower, 80 E. 1st N., Farmington, Utah
Filed May 7, 1962, Ser. No. 192,756
2 Claims. (Cl. 222—178)

The present invention relates to dispensers of seed, fertilizer, insecticides, and other plant conditioning, sowing, and/or treating materials of dry granular character (e.g. pellets, seeds, or fine grain dust materials) and, more particularly, to a new and improved dispenser, capable of dispensing any of the above materials in their dry state, which is small, efficient to use, manually drawn and operated, and which performs its intended functions in a highly efficient manner.

Accordingly, the primary object of the present invention is to provide a new and useful, wheel-borne dispenser.

A further object of the present invention is to provide a dispenser which is inexpensive to manufacture and which operates in a highly satisfactory manner.

A further object of the invention is to provide a new and improved dispenser wherein novel control means are provided to cause the dispensing of materials in a desired manner from the machine.

A further object of the invention is to provide a blower-incorporating dispenser wherein a portion of the air draft generated by the blower is fed into the bin of the machine in such a manner as to facilitate the proper movement of materials from the bin to the ejection channel or passageway of the machine.

A further object of the invention is to provide a new and improved, battery powered dispenser wherein the power source thereof may be conveniently charged as desired for further use of the machine.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a side elevation of the dispenser machine according to the present invention.

FIGURE 2 is a plan of the structure of FIGURE 1.

FIGURE 3 is a view partially in section taken along the line 3—3 in FIGURE 2.

FIGURE 3A is an enlarged schematic detail of the electrical switch means employed.

FIGURE 4 is a vertical transverse section taken along the line 4—4 in FIGURE 2.

FIGURE 5 is a section along line 5—5 in FIGURE 2.

FIGURE 6 is an enlarged, fragmentary, sectional view, taken along the line 6—6 in FIGURE 2, and illustrates the interior of the structure, showing the manner in which rotational displacements of the control shaft effect communication between the bin of the machine and the blower channel.

FIGURE 6A is an enlarged, fragmentary, sectional view similar to FIGURE 6 and illustrates the opening of the hinged door construction of the machine.

FIGURE 7 is a fragmentary view of the rear end portion of the machine illustrating one type of ejector useable therewith.

FIGURE 8 illustrates another ejector which may be used with the machine in lieu of that shown in FIGURE 7.

FIGURE 9 is an end view similar to FIGURE 7 but illustrates a further type of ejector which may be used with the machine.

FIGURE 10 is a plan view of the ejector shown in FIGURE 9.

In FIGURE 1 frame 10 includes horizontally disposed base structure 11 and a pair of handle members 12 and 13 welded or otherwise secured to base structure 11. The handle members 12 and 13 include clamps 14 and 14', of conventional design, for securing flexible control cable 15 therebetween. Flexible control cable 15 includes a sheath 16 and flexible control cable 17, all of conventional design. The control cable 15 is also clamped by suitable clamp means 18 and 19 to the base structure 11 and also by clamps 20 and 21 to an upstanding stationary panel 22. At this point it should be observed that the panel 22 may or may not be used; if not used, then the equipment mounted thereon will generally be secured simply to the bin 23. Bin 23 is adapted to contain any of the above designated materials, is securely mounted in an upright position to base structure 11, and is provided with a lid 24 preferably air-tight, which is removable from the bin 23 so that the latter may receive desired dry contents.

Control cable 17 is provided with an actuator knob 25 for accommodating the inward and outward movement of the control cable with respect to its sheath 16.

Bushings or other journals 26 and 27 mount the control shaft 28 within bin 23 and adapt the control shaft 28 for rotatable movement within bin 23.

Fixedly secured to control shaft 28 and exterior of bin 23 is a lever 29 one extremity 30 of which is secured to the control end of control cable 17 as shown in FIGURE 3. The remaining extremity 30' of control lever 29 is provided with an insulator button 31 which, upon the counter-clockwise rotation of control lever 29 about control shaft 28, operates to engage switch arm 31' so as to urge the latter, against the pressure of spring 32, out of contact with the contact 33. Contact 33 is soldered or otherwise electrically connected to electrical lead 34 which in turn is connected to one terminal of the battery 35. The remaining battery lead 36 is series connected to blower 37, the latter being electrically interposed between battery 35 and the electrical lead 38 which is electrically connected to switch arm 31'.

The above description of the structure used thus clarifies the nature and operation of the electrical system of the machine. Under normal conditions the knob 25 in FIGURE 2 will be disposed to its extreme "right" position (the extreme "left" position being shown) so that control shaft 28 will be rotationally displaced to its maximum, counter-clockwise position, thereby breaking the circuit between electrical leads 34 and 38 so as to render the conventional blower 37 inoperative. When the knob 25 is pulled outwardly or advanced to the "left" position shown in FIGURE 2, then the control lever 29 will be pulled downwardly at its right end (30) by the action of control cable 17 so as to permit switch arm 31' to come in contact with electrical contact 33, thereby closing the circuit to blower 37 and allowing the same to operate.

Rotational displacement of control lever 29 produces another action which is now to be described.

Disposed within and welded or otherwise secured to the sides of bin 23 is certain materials—descent-constraining structure 35' which, shown in particular in FIGURES 4 and 5, takes the form of a type of funnel structure having an annular flange 36' spot-welded or otherwise secured to the bin 23, and also having an elongate opening 37' in part delineated by depending flanges 38' and 39'. These depending flanges 38' and 39' form passageway walls for blower passageway 40, the same also being defined by the base structure 11 and hinged door halves 41 and 42. As illustrated in FIGURE 6A, the door halves 41 and 42 are riveted or otherwise affixed to piano hinge halves 43 and 44 of hinges H, cooperating hinge halves 45 and 46 of which are riveted or otherwise secured to the passageway structure as illustrated in FIGURE 6. It is desirous that a finger 47 be affixed to door half 41 and be contoured as indicated in FIGURE 6 such that, even during the open condition wherein the door halves 41 and 42 permit the descent of materials used from bin 23 into passageway 40, the upward travel of one of the door halves (i.e. door half 42) will simultaneously produce the similar closing of the adjacent door half 41 by virtue of the engagement of finger 47 with door half 42.

Door halves 41 and 42 are so constructed and arranged that when they are in their closed positions illustrated in FIGURE 6, no descent of materials from the bin 23 to blower passageway 40 is permitted, whereas when the doors are caused to open, then, and depending upon the spaces chosen between the door halves 41 and 42, as selected by the positioning of knob 25, some of the agricultural materials disposed in bin 23 will be metered into passageway 40.

As illustrated in FIGURE 6 and 6A, particularly, such opening of the door halves 41 and 42 is accomplished by clockwise rotational displacement of control shaft 28 in the position shown in FIGURE 6 to that shown in FIGURE 6A. This is by virtue of the incorporation of work arm 47, radially affixed to control shaft 28, and also to the provision of the elongate member 48 which, as shown in FIGURE 6A, for example, is secured to the lever 47 and to the door half 42. Rotational displacements of the control shaft 28, again, are produced through the actuation of control cable 17 by control knob 25.

The structure as defined is such, and it must be emphasized, that the agricultural material comes from bin 23 through metering aperture 37 into passageway 40. The passage of the material is controlled solely by the door halves 41 and 42 which, when closed, serve as baffles. Thus, outward pulling upon the control knob 25 and its control cable will produce simultaneously the closing of the electrical circuit (see FIGURE 3) to blower 37 and also will produce the rotation of control shaft 28 so as to open the door halves 42 and 41 for metering the dust into blower passageway 40.

Blower passageway 40 registers with an outlet fitting 50 to which may be attached any one of a number of ejectors 51, 52, and 53 as illustrated in FIGURES 1, 5, and 7–10. The Y ejector 53 takes its form so that "spraying" is accomplished in both directions rearwardly from the machine when in use. Ejector fitting 52 in FIGURE 8, on the other hand, is simply a cylindrical tube which ejects in a straight rearward direction. FIGURES 1, 5 and 7 illustrates a third type of ejector nozzle fitting 51 wherein the same is configured so that the material is deposited directly against the ground being treated. All of the ejectors will, of course, be hollow and take straight canted, or Y forms as desired. Ejectors 51, 52, and 53 may preferably be of square cross-section and, with the registering fitting of the machine being likewise so constituted, will be adapted for four-way positioning to obtain the desired character of spread. Other types of arrangements for the ejectors or nozzle fitting, generally termed as "spreading" in the industry, are conceivable.

Thus, it is seen that when the machine is turned on by the actuation outwardly of control cable 17, that blower 37 is energized, and the bin 23 is caused to descend through the materials descent constraining structure into passageway 40, there to be blown thereout through the registering fitting by the blower 37.

Of special importance, and in a preferred embodiment of the invention, there is provided a passageway 52' which is supplied by conduit 53' or other means leading between blower 37 and the bin 23. This conduit 52' may be a very small tube, pipe, or simply a communicating aperture within the bin or other structure. In any event, the same is preferable to incorporate since a slight quantity of air blowing into the dust bin will render of more uniform density the contents thereof so that a desired metering of materials into the passageway 40 may be obtained. Preferably, the forced air entering the bin should be directed directly over the top surfaces of the dispensing gate (door halves 41 and 42), in substantially parallel relationship therewith, so that optimum metering of the contents of the bin is obtained. In the absence of this, then, when the bin is completely filled, there may be an excess (or even a stoppage) of material flowing into the passageway 40 so that the dispensing characteristics of the machine are altered deleteriously.

To render the machine more adapted for convenient use there may be provided an alternating current outlet 53" which feeds into a converter 54, the same being used for charging battery 35 by means of electrical leads 55 coupled thereto. It will be realized that if it is desired that the movement of control knob 25 (in FIGURE 2) to the right and inwardly of the structure, effectuate an opening of the metering structure and an energizing of the blower, that appropriate modification may be made as by reversing switch and cable relation with respect to control lever 29.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A dry granular-materials dispensing machine including, in combination, a frame comprising wheel-borne base structure and means affixed thereto for drawing the desired over desired terrain; a bin, adapted to receive and contain agricultural materials, disposed upon and supported by said base structure; a blower mounted upon said base structure; means for powering said blower coupled thereto; structure defining a passageway communicating with said blower and selectively communicating with said bin for selectively communicating with said bin for selectively receiving contents from said bin to be blown out said passageway by said blower; and means affixed to said bin for metering contents thereof into said passageway, as desired, and wherein said metering means comprise hinged door means disposed between said bin and said passageway, and means for simultaneously opening said hinged door means, to meter contents within said bin into said passageway, and energizing said powering means to power said blower, and wherein said simultaneously opening and energizing means comprises a control shaft journaled within said bin, elongate means coupled to said control shaft and to said hinged door means for opening said hinged door means upon production of rotational displacements of said control shaft, a control lever fixedly secured to said control shaft exterior of said bin and extending on opposite sides thereof, switch means coupled to said powering means and electrically interposed between said powering means and said blower, said control lever on one side of said control shaft actuating said switch means, enabling the same to close upon the opening of said hinged door means, and manually operable means mechanically coupled to the said control lever on the remaining side thereof to produce rotational displacements thereof about said control shaft.

2. As a dispenser of dry, granular, agricultural materials including dusts, in combination, a nominally vertically disposed, closed bin; structure defining an exhaust passageway communicatively disposed beneath said bin and oriented in a transverse direction with respect to said bin; adjustable, elongate gate means disposed between said bin and said exhaust passageway for metering contents of said bin into said passageway, said bin being provided with air-flow, auxiliary passageway means disposed proximately above said gate means and oriented in a direction nominally parallel to and across said gate means; and means for blowing air directly through said structure to exhaust contents of said passageway and also for blowing metered air through said auxiliary passageway means in a shunting path, disbursing possible material accumulations at said gate means, which path joins said passageway defined by said structure by flowing through said gate means.

References Cited in the file of this patent

UNITED STATES PATENTS

| | | |
|---|---|---|
| 568,776 | Leggett | Oct. 6, 1896 |
| 917,649 | Otto | Apr. 6, 1909 |
| 1,376,944 | King et al. | May 3, 1921 |
| 2,307,798 | Kook et al. | Jan. 12, 1943 |
| 2,476,465 | Tarrant | July 19, 1949 |
| 2,718,343 | Brown | Sept. 20, 1955 |
| 3,029,000 | Kobee | Apr. 10, 1962 |